W. C. FISH.
SPEED VARYING DEVICE FOR MACHINE TOOLS.
APPLICATION FILED APR. 2, 1903.
1,008,593. Patented Nov. 14, 1911.
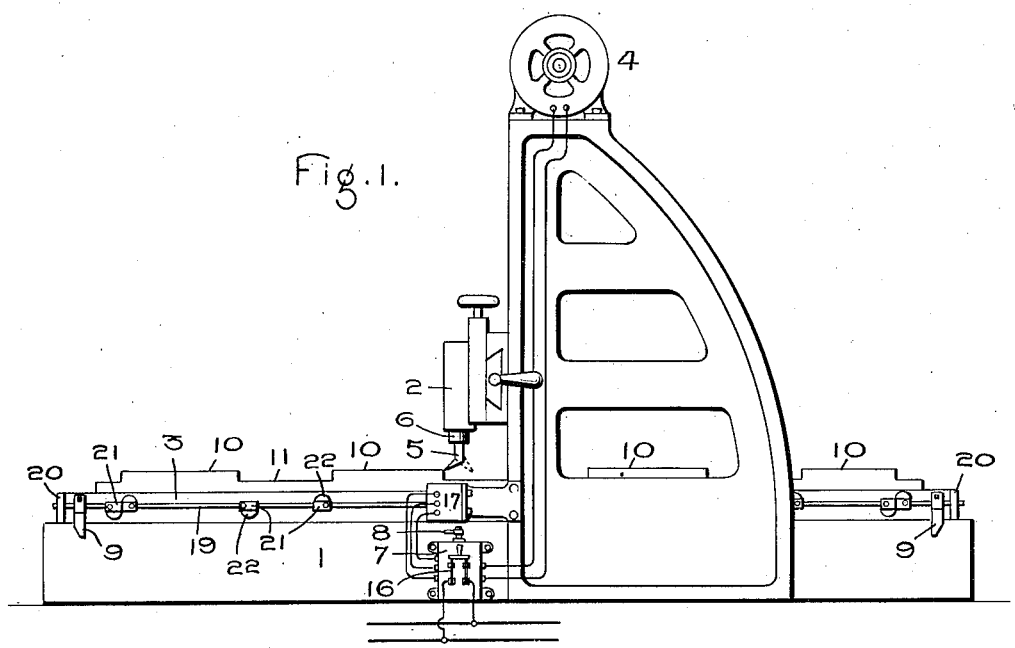
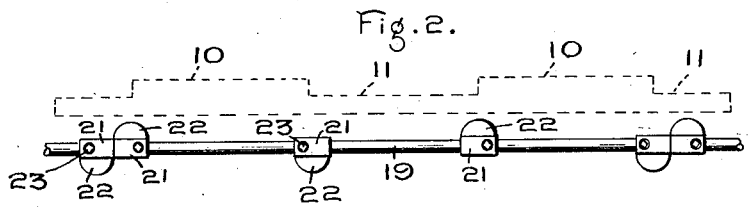
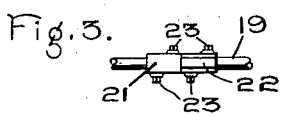
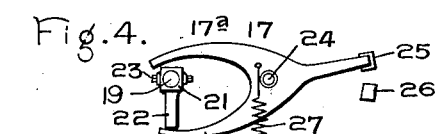
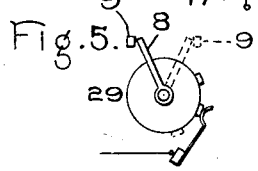
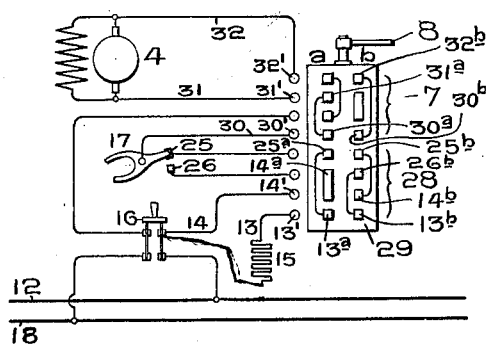
Witnesses:
Marcus L Byng.
Helen Alford
Inventor:
Walter C. Fish,
by Albert G. Davis
Att'y

UNITED STATES PATENT OFFICE.

WALTER C. FISH, OF LYNN, MASSACHUSETTS, ASSIGNOR TO GENERAL ELECTRIC COMPANY, A CORPORATION OF NEW YORK.

SPEED-VARYING DEVICE FOR MACHINE-TOOLS.

1,008,593.          Specification of Letters Patent.      Patented Nov. 14, 1911.

Application filed April 2, 1903. Serial No. 150,710.

*To all whom it may concern:*

Be it known that I, WALTER C. FISH, a citizen of the United States, residing at Lynn, county of Essex, State of Massachusetts, have invented certain new and useful Improvements in Speed-Varying Devices for Machine-Tools, of which the following is a specification.

This invention relates to machine tools, and its object is to provide means for varying the speed of the machine in accordance with the work being done by the cutting tool.

In operating planers, milling machines, shaping machines, and the like, the relative movement of the cutting tool and the work is usually at the same rate of speed during the entire working travel or stroke. On the return stroke, the movement is usually more rapid, as no work is being done. But in many jobs there are portions below the level at which the tool is cutting which do not require to be operated on, and yet the tool must travel idly over these portions at the normal slow cutting speed. This involves considerable loss of time, and the object of my invention is to cause the tool to move quickly over such idle spots but resume its normal speed when it reaches a portion on which it is to take a cut.

Many different ways may be devised for carrying out my invention. I prefer to drive the machine tool by means of an electric motor, and to provide for the reversal of the motor when the stroke of the bed or the cutting tool is to be reversed. I also provide means for varying the voltage of the current supplied to said motor, in accordance with the cutting periods and idle periods of the tool so that the motor will run at a moderate speed when the tool is taking a cut, and at a higher speed when the tool is passing idly over portions below its level. I prefer to use a reversible tool, so that it will cut on each stroke of the bed or porter-bar, and in this case the current-controller must be capable of reverse action on the return stroke, all as hereinafter set forth and particularly pointed out in the claims.

In the accompanying drawing, Figure 1 is a side elevation of a planer equipped with my invention; Fig. 2 is a side elevation, on a larger scale, of part of the cam-rod and cams; Fig. 3 is a top plan view of a portion thereof; Fig. 4 is a side elevation of the current-controlling switch; Fig. 5 is a top plan view of the reversing switch; Fig. 6 is a diagram of the circuits.

The invention is applicable to a large variety of metal-working and wood-working machines, but for convenience I have shown it applied to a metal planer having a frame 1, an adjustable tool-carriage 2, a reciprocating work-table or bed 3, and an electric motor 4 for moving said bed and operating the tool-feeding devices, the latter being not shown to avoid complicating the drawing. The cutting-tool 5 is preferably mounted in a rotatable holder 6, so that it can be reversed at the end of each stroke of the bed and will thus cut both ways. Such tool-holders have been heretofore patented and form no part of my invention. See for example, the patent to Paine, No. 119,395, Sept. 26, 1871.

The direction of rotation of the motor is controlled by a reverser 7 whose handle 8 is moved one way or the other by dogs 9 secured adjustably to the reciprocating bed 3 at points just beyond the ends of the piece which is being planed. This piece of work is represented as having high portions 10 on which a cut is taken, and low portions 11 over which the tool passes idly.

The motor is supplied with current from a positive main 12 through one or the other of two branch leads 13, 14, the former including a non-inductive resistance 15. A double-pole switch 16 connects the main 12 with the leads 13, 14. A switch 17 connects one or the other of these leads with one terminal of the motor, the other motor terminal being connected by switch 16 directly with the negative main 18. The reversing switch 7 is interposed between the switch 17 and the motor. When the lead 13 is in circuit, the motor runs slowly, and when the lead 14 is cut in, the motor speeds up.

In order to shift the switch 17 automatically at the proper time, the bed of the planer carries cams to actuate said switch. These are preferably constructed and arranged as follows: A rod 19 extends along the side of the bed, being supported at each end in brackets 20 on said bed. Slidably and rotatably mounted on the rod are a plurality of blocks 21, each having a rounded lug or cam 22, and provided with one or more set screws 23, to enable it to be adjustably secured to the rod. The switch 17 has two legs 17ᵃ, 17ᵇ which straddle the rod 19, the space between the ends of said legs being just sufficient to permit a cam-block to pass through as shown in Fig. 4. As the bed moves along, the cams rock the switch on its pivot 24, and cause it to make contact alternately with the plates 25, 26, which form the terminals of the branch leads 13, 14. A spring 27 gives the switch a snap action in passing from one plate to the other by adjusting the cams to correspond with the high and low portions of the work, the motor will be speeded up and slowed down accordingly. The cams are made rotatable on the rod so that they can be set to throw the switch up or down as desired.

The arrangement of cams which will make the proper speed changes when the bed moves in one direction will produce just the opposite effect when it moves in the opposite direction. It is therefore necessary to reverse not only the motor connections but the connections between the leads 13, 14, and the plates 25, 26, at each end of the stroke of the bed. This is done by means of a reversing switch 28, and the two reversing switches may be conveniently grouped in one structure. Fig. 6 shows the development of such a double reverser, the movable segments being shown by rectangles, and the stationary contact-fingers by circles. The movable segments are in practice mounted on a rotatable cylinder 29, which is oscillated by the dogs 9 at the end of each stroke. By tracing out the circuits, in connection with the arrangement of cams in Fig. 2, it will be seen that the high portions of the work will move slowly under the tool in both directions, and the low portions will move rapidly. Thus with the parts standing as shown, the bed is moving to the right and the switch 17 has been thrown onto the plate 25. The reverser is in such position that the tier of segments marked $a$ is supposed to be in contact with the fingers. Current will therefore flow through the lead 13, the resistance 15, the finger 13′, the connected segments 13ᵃ, 25ᵃ, the plate 25, switch 17, lead 30, finger 30′, segments 30ᵃ and 31ᵃ, finger 31′ and lead 31 to the motor. When the end of the cut on the high portion 10 is reached, the upwardly projecting cam will shift the switch 17 to the plate 26, and a current of higher voltage will flow to the motor through the lead 14, finger 14′, segment 14ᵃ, plate 26, switch 17, lead 30, finger 30′, segments 30ᵃ, 31ᵃ, finger 31′ and lead 31. As the bed reaches the end of its movement to the right the end cam throws the switch 17 up to the plate 25 and the motor slows down just before it is reversed. As soon as the reverser is moved to position $b$, the motor begins running in the other direction and the bed begins its movement to the left, the tool having been reversed also. The circuit is at first through lead 14, finger 14′, segments 14ᵇ, 25ᵇ, plate 25, lead 30, finger 30′, segments 30ᵇ and 32ᵇ, finger 32′ and lead 32 to the motor, which is thus caused to run rapidly until the tool reaches its cut, when the second cam throws the switch over to the plate 26, and the circuit is then via lead 13, resistance 15, finger 13′, segments 13ᵇ and 26ᵇ, plate 26, to switch 17 and thence to lead 32 as before. It will be noted that for this position of the reverser, the motor runs slowly when the switch 17 is on plate 26, whereas in the first position it runs slowly when the switch is on plate 25.

Many other schemes for carrying out my invention may be devised, and I do not wish to be understood as limiting myself to the one hereinbefore described.

What I claim as new, and desire to secure by Letters Patent of the United States, is,—

1. The combination with a planer or similar machine tool and its reciprocating driving means, of means for varying the speed of said driving means during movement in a single direction corresponding to the cutting periods and idle periods of the cutting tool, and means for reversing the operation of said speed varying means upon reversal of the direction of movement of the machine.

2. The combination with a planer or similar machine tool adapted to operate on both forward and return movements and its reciprocating driving means, of means for varying the speed of said driving means during movement in a single direction according to the cutting periods and idle periods of the cutting tool, and means for reversing the operation of said speed varying means simultaneously with the reversal of direction of movement of the machine.

3. The combination with a planer or similar reciprocating machine tool adapted to operate on both forward and return movements, of means comprising a movable member for varying its speed, an operator therefor driven by the reciprocating tool and provided with actuating devices for engaging said movable member and corresponding to the cutting and idle periods of the cutting tool, and means for reversing the operation of said speed varying means upon reversal of direction of movement of said machine.

4. The combination with a planer or similar reciprocating machine tool adapted to operate on both forward and return movements, of means comprising a pivoted member for varying its speed, an operator therefor driven by the reciprocating machine tool and provided with actuating surfaces for engaging said pivoted member and so disposed as to effect an increase of speed at the commencement of the idle periods and a decrease of speed at the commencement of the cutting periods of the cutting tool, and means for reversing the operation of said speed changing means upon reversal of the machine.

5. The combination with a double acting planer, of means for varying its speed, a speed changing device having a movable actuating member, cams or projections for controlling said actuating member carried by the movable member of the planer, and means for reversing the effect of said cams or projections upon the speed changing device on reversal of the direction of movement of said movable member.

6. The combination with a machine tool, of an electric motor for driving it, a reversing switch for said motor, leads for supplying current of different voltages to said motor, a switch controlling said leads, means for automatically shifting said controlling switch in accordance with the work, and a reversing switch for said leads.

7. The combination with a machine tool, of an electric motor for driving it, a reversing switch for said motor, leads for supplying current of different voltages to said motor, a switch controlling said leads, means for automatically shifting said controlling switch in accordance with the work, a reversing switch for said leads, and means for operating said reversing switches simultaneously.

In witness whereof I have hereunto set my hand this 30th day of March, 1903.

WALTER C. FISH.

Witnesses:
 DUGALD McK. McKILLOP,
 JOHN A. McMANUS.